US010922441B2

(12) United States Patent
Mo et al.

(10) Patent No.: US 10,922,441 B2
(45) Date of Patent: Feb. 16, 2021

(54) DEVICE AND METHOD FOR DATA SECURITY WITH A TRUSTED EXECUTION ENVIRONMENT

(71) Applicant: Huawei Technologies Co., Ltd., Shenzhen (CN)

(72) Inventors: Zhijun Mo, Waterloo (CA); Jianfei Ye, Waterloo (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 290 days.

(21) Appl. No.: 15/971,498

(22) Filed: May 4, 2018

(65) Prior Publication Data
US 2019/0340393 A1 Nov. 7, 2019

(51) Int. Cl.
G06F 21/74 (2013.01)
G06F 21/55 (2013.01)
H04L 9/08 (2006.01)

(52) U.S. Cl.
CPC ............ G06F 21/74 (2013.01); G06F 21/554 (2013.01); H04L 9/083 (2013.01); H04L 9/0822 (2013.01); H04L 9/0894 (2013.01); G06F 2221/034 (2013.01)

(58) Field of Classification Search
CPC .. G06F 21/74; G06F 21/554; G06F 2221/034; H04L 9/0822; H04L 9/083; H04L 9/0894
See application file for complete search history.

(56) References Cited

U.S. PATENT DOCUMENTS

| 8,332,931 | B1 * | 12/2012 | Tran .................. G06F 21/74 726/17 |
| 9,064,135 | B1 | 6/2015 | Poo et al. |
| 9,906,361 | B1 * | 2/2018 | Perlman ............... G06F 16/22 |
| 2010/0229219 | A1 * | 9/2010 | Mendonca ............ G06F 21/74 726/4 |
| 2014/0037093 | A1 * | 2/2014 | Park ..................... H04L 9/0816 380/277 |
| 2015/0293857 | A1 * | 10/2015 | Cope .................... G06F 21/602 713/193 |
| 2015/0319160 | A1 * | 11/2015 | Ferguson ............ G06F 21/6281 726/10 |

(Continued)

FOREIGN PATENT DOCUMENTS

CN 105637800 A 6/2016
CN 106878231 A 6/2017
(Continued)

*Primary Examiner* — Joseph P Hirl
*Assistant Examiner* — Stephen T Gundry
(74) *Attorney, Agent, or Firm* — Slater Matsil, LLP (57) ABSTRACT

A computing device includes: a trusted execution environment with access to a memory storing a deletable root key, the memory inaccessible by a second execution environment; and at least one processor operable in the trusted execution environment, wherein when operating in the trusted execution environment, the at least one processor is configured for: based on requests from the second execution environment, performing a root key operation on an encryption key utilized by the second execution environment to secure data the second execution environment; and deleting the root key upon detection of a security event.

20 Claims, 10 Drawing Sheets

(56) References Cited

U.S. PATENT DOCUMENTS

| | | | |
|---|---|---|---|
| 2016/0070932 A1* | 3/2016 | Zimmer | H04L 9/0894 |
| | | | 713/192 |
| 2016/0234176 A1 | 8/2016 | Chu et al. | |
| 2016/0254904 A1* | 9/2016 | Hjelm | H04L 9/006 |
| | | | 713/155 |
| 2016/0350561 A1* | 12/2016 | Poiesz | G06F 21/74 |
| 2017/0185789 A1* | 6/2017 | Khosravi | G06F 21/6209 |
| 2017/0187526 A1 | 6/2017 | Ferguson et al. | |
| 2017/0337390 A1* | 11/2017 | Hamilton | H04L 9/0861 |
| 2017/0344407 A1* | 11/2017 | Jeon | H04L 9/3297 |
| 2018/0115530 A1* | 4/2018 | Ranjan | H04L 63/0428 |
| 2018/0152454 A1* | 5/2018 | Kwon | H04L 63/10 |
| 2018/0165479 A1* | 6/2018 | Chen | H04L 9/0819 |
| 2018/0239897 A1* | 8/2018 | Ventura | G06F 21/53 |
| 2018/0254898 A1* | 9/2018 | Sprague | H04L 9/3271 |
| 2018/0373878 A1* | 12/2018 | Jung | H04L 9/0861 |
| 2019/0005229 A1* | 1/2019 | Hlaing | G06F 21/725 |
| 2019/0042706 A1* | 2/2019 | Dewan | G06F 21/10 |
| 2019/0140836 A1* | 5/2019 | Novak | H04L 63/061 |
| 2019/0140846 A1* | 5/2019 | Moore | H04L 9/3265 |

FOREIGN PATENT DOCUMENTS

| | | | |
|---|---|---|---|
| EP | 2759955 | A1 | 7/2014 |
| EP | 2953290 | A1 | 12/2015 |
| EP | 3293653 | A1 | 3/2018 |

\* cited by examiner

DEVICE AND METHOD FOR DATA SECURITY WITH A TRUSTED EXECUTION ENVIRONMENT

FIELD

This relates to data security, and in particular, embodiments of the present disclosure related to methods for data security for computing devices and trusted execution environments.

BACKGROUND

Modern computing devices are used for a wide variety of purposes, many of which involve data that is private, proprietary or sensitive to the user or to other entities. For example, computing devices such as smart phones are often used to store financial data such as account numbers, payment credentials, biometric data such as fingerprints, PINs and passwords. In addition, computing devices commonly store encryption keys and the like, for example, for secure communication and document storage or for playback of copy-protected media. Such data is valuable to users and to other entities such as software developers, enterprises, financial institutions and media owners and publishers. Protection of sensitive data (in particular, against unauthorized access to such data) is important.

SUMMARY

In accordance with an embodiment, there is provided a computing device comprising: a trusted execution environment with access to a memory storing a deletable root key, the memory inaccessible by a second execution environment; and at least one processor operable in the trusted execution environment, wherein when operating in the trusted execution environment, the at least one processor is configured for: based on requests from the second execution environment, performing root key operations on an encryption key utilized by the second execution environment to secure data accessible by the second execution environment; and deleting the root key upon detection of a security event.

In accordance with another embodiment, there is provided a computer implemented method for securing data comprising: storing a deletable root key in a memory accessible by a trusted execution environment of a computing device, the memory inaccessible by second execution environment; based on requests from the second execution environment, performing, by at least one processor of the computing device operating in the trusted execution environment, root key operations on an encryption key utilized by the second execution environment to secure data accessible by the second execution environment; and upon detection of a security event, deleting the root key in the memory.

In accordance with another embodiment, there is provided a non-transitory computer-readable storage medium or media having stored thereon computer-executable instructions which when executed configure at least one processor operating in a trusted execution environment of a computing device to: store a deletable root key in a memory accessible by the trusted execution environment, the memory inaccessible by a second execution environment; based on requests from the second execution environment, perform, root key operations on an encryption key utilized by the second execution environment to secure data accessible by the second execution environment; and upon detection of a security event, delete the root key in the memory.

BRIEF DESCRIPTION OF DRAWINGS

Embodiments will be described, by way of example only, with reference to the attached figures, wherein in the figures.

It is understood that throughout the description and figures, like features are identified by like reference numerals.

DETAILED DESCRIPTION

Embodiments of methods, systems, and apparatus are described through reference to the drawings.

The following discussion provides example embodiments of the inventive subject matter. Although each embodiment may represent a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Figure 1:
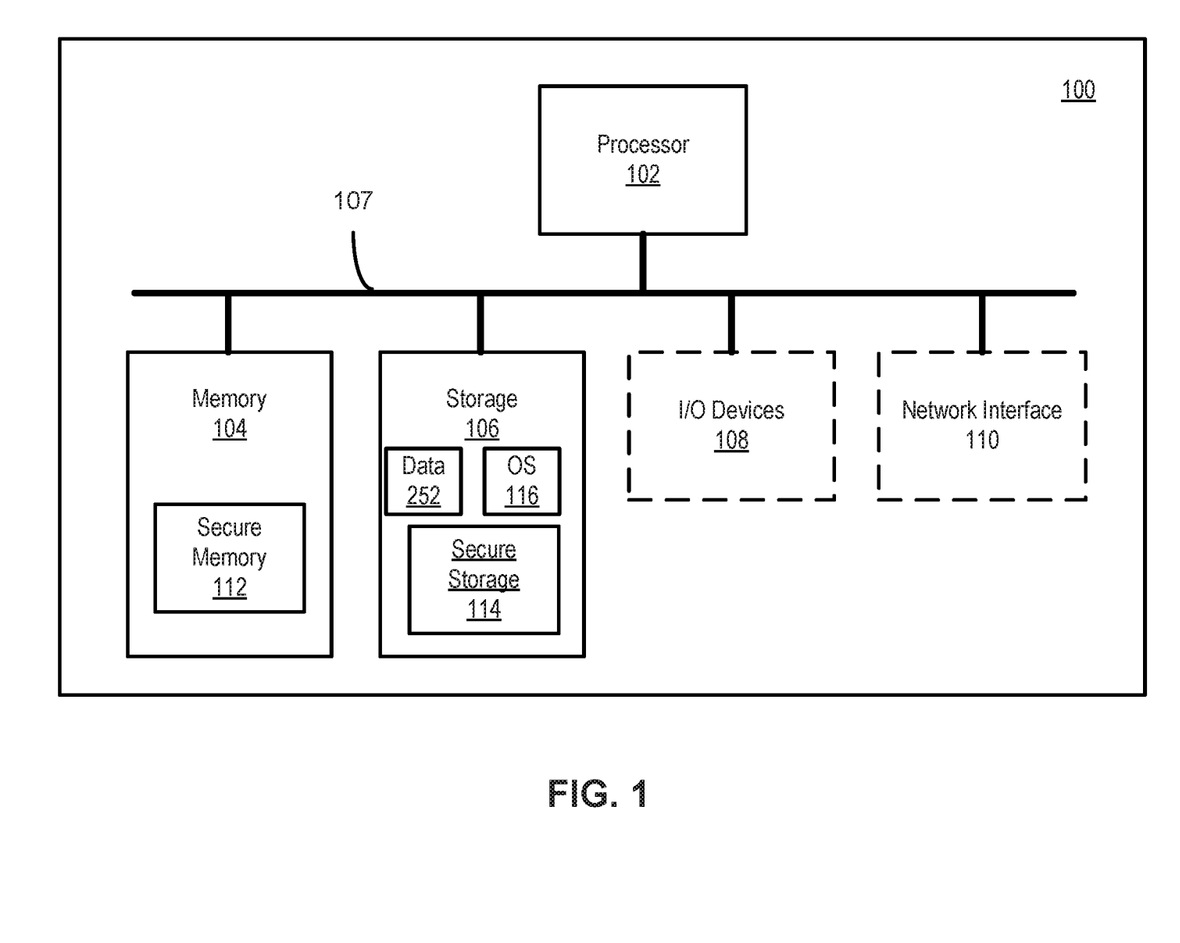
FIG. 1 illustrates, in a schematic diagram, an example of a computing device.

FIG. 1 illustrates, in a schematic diagram, an example of a computing device 100 in accordance with an embodiment of the present disclosure. Computing device 100 may be, for example, a smart phone, tablet computer, personal computer such as a notebook computer, wearable computing device, Internet of Things (IoT) device, or the like.

Computing device 100 includes several components, including a processor 102, memory 104, storage 106, and a bus 107 to connect the components of computing device 102. Computing device 100 may also include additional components, such as one or more input/output (I/O) devices 108 and one or more network interface 110 (shown in dashed lines). Components of computing device 100 may be formed in one or more semiconductor chips, mounted to a printed circuit board for communication between components. In some embodiments, multiple components, e.g., processor 102 and network interface 110 are incorporated in a single semiconductor chip, referred to as a system-on-chip. In other embodiments, each component is a discrete chip.

Processor 102 is any suitable type of processor, such as a processor implementing an ARM or x86 instruction set.

Memory 104 is any suitable type of random-access memory accessible by processor 102. Memory 104 includes a secure memory 112. In some embodiments, secure memory 112 is a discrete physical module. In other embodiments, memory 104 is segmented to define secure memory within the same physical module as other memory. In some embodiments, secure memory 112 occupies a range of memory addresses within an address space of memory 104. In some embodiments, secure memory 112 is accessible by processor 102 within a different memory space.

Storage 106 may be, for example, one or more NAND flash memory modules of suitable capacity, or may be one or more persistent computer storage devices, such as a hard disk drive, a solid state drive, and the like. Storage 106 includes a secure storage 114. In some embodiments, secure storage 114 resides on a device shared with other storage 106. In other embodiments, secure storage 114 resides on a discrete hard drive, flash storage or the like.

Bus 107 may be one or more of any type of several bus architectures including a memory bus or memory controller, and a peripheral bus.

I/O devices 108 include, for example, user interface devices such as a capacitive or resistive touch-sensitive screen capable of receiving input in the form of touches, or a touch screen display with integrated touch sensors configured to receive input when touches on the touch screen display are detected and to render images thereon as output. In some embodiments, I/O devices 108 additionally or alternatively includes one or more of speakers, microphones, sensors such as accelerometers and global positioning system (GPS) receivers, keypads, a touchpad, or the like. In some embodiments, I/O devices 108 include ports for connecting computing device 100 to other computing devices. In an example, I/O devices 108 include a universal serial bus (USB) controller for connecting the computing device 100 to peripherals or to host computing devices.

Network interface 110 is capable of connecting computing device 100 to one or more communication networks. In some embodiments, network interface 110 includes one or more wireless radios, such as W-Fi or cellular (e.g. GPRS, GSM, EDGE, CDMA, LTE or the like) for wirelessly connecting computing device 100 to a wireless communication network.

Computing device 100 operates under control of software programs including an operating system (OS) 116. Computer-readable instructions of software programs are stored in storage 106 or secure storage 114, and executed by processor 102 in memory 104 or secure memory 112.

In some embodiments, a computing system includes or is configured to provide a plurality of distinct execution environments. In some other embodiments, computing device 100 includes or is configured to provide a plurality of distinct execution environments. In a computing device 100 with a plurality of distinct execution environments, different environments may be provided access to different storage and processing resources. The isolation of these environments can be enforced using software or hardware. In some embodiments, one of the environments may be referred to as trusted execution environment (TEE) and may have access to isolated and secure storage and processing resources. These resources can include separate processors (for example a single core in a multi-core processor may be allocated to the TEE) and isolated storage (in addition to registers associated with the isolated core, a distinct memory address range can be dedicated to the use of such a processor or co-processor). This environment may support a distinct operating system, or it may be a set of secure resources accessible to applications that are assigned to use it by the underlying operating system (e.g. OS 116) of the overall system. In some embodiments, a dedicated secure storage resource, such as secure storage 114 within a general storage resource (e.g. storage 106) and a dedicated secure memory, such as secure memory 112, within the general memory resource (e.g. memory 104) may be present. Those skilled in the art that in some embodiments these secure resources may be at least one of physically and logically distinct from the general resources of the same type. As noted above, in a multi-core processor, one or more of the cores may be dedicated to one or more TEEs. In other embodiments, a co-processor external to processor 102 may provide the secure processing resources for the TEE.

In a computing device 100 that includes or is configured to provide two distinct execution environments, the first execution environment is a secure execution environment and the second execution environment is a potentially unsecure environment. The secure execution environment is sometimes referred to as a trusted execution environment (TEE) and the potentially unsecure environment is sometimes referred to as a rich execution environment (REE)

In a computing device 100 that includes or is configured to provide two distinct execution environments, a computing device, such as computing device 100, includes or is configured to provide a secure execution environment, and a second computing device different than the first computing device, includes or is configured to provide a second, potentially unsecure, execution environment. The second execution environment (e.g. the potentially unsecure execution environment) is configured to communicate with the f execution environment (e.g. the first execution environment) to request key operations as described herein.

The following terminology is used herein:
TEE—Trusted Execution Environment
REE—Rich Execution Environment
TA—Trusted Application
CA—Client Application
FDE—Full Disk Encryption
FBE—File Based Encryption
DEK—Device Encrypted Key
CEK—Credential Encrypted Key
KEK—Key Encryption Key
KMS—Key Management Service In an example embodiment, processor 102 includes one or more ARM Cortex-ATM cores and includes software (e.g. TrustZone™ technology) with secure monitor logic for logically dividing (e.g. virtually partitioning) the processor in the ARM architecture with one logical division enabling the processor to execute in the secure execution environment, and in another logical division, the processor is configured to execute in the second execution environment.

Other implementations are possible. As noted, secure memory 112 may be located in a separate physical memory module from memory 104. Alternatively or additionally, secure memory 112 may be accessible in a different address space or in a different address range. Likewise, secure storage 114 may be located in a separate physical memory device or in a different partition or sector of storage 106. In some embodiments, separate execution environments have separate physical processors and/or other hardware components.

In some embodiments, the two distinct execution environments include or otherwise have access to separate resources. For example, each of the secure execution environment and the second execution environment can have hardware and software modules. The secure execution environment has a secure processor (which may be virtual partition of processor 102 or a separate hardware component), secure memory (which may be a virtual partition of memory 104 or a separate physical memory), and software code including a secure operating system OS. The secure OS is loaded into the secure memory and executed by the secure processor to perform aspects of the methods described herein (and other secure OS operations). The secure OS can be stored in secure storage 114 or storage 106 (It does not need to be stored in secure storage as long as it is encrypted using for example an encryption key chain as described herein.

The second execution environment includes an unsecure portion of processor 102, memory 104, and storage 106. Software code of the second execution environment can include an unsecure OS which is stored in storage, loaded into memory 104 at run time, and executed by processor 102 to perform OS operations.

In some embodiments, the secure execution environment is a trusted execution environment (TEE) and the second execution environment is a rich execution environment (REE) as defined by the Global Platform TEE system architecture. For example, in some embodiments, computing device 100 is compliant with Global Platform TEE System Architecture v1.0 and include a secure operating system that is compliant with the trusted execution environment specifications defined therein. In some embodiments, the secure operating system, the operating systems 116, and computing device 100 implement Global Platform TEE API specifications such as TEE Client API Specification v1.0 and TEE Internal Core API Specification v1.1.1.1 and communication between the secure operating system and operating system 116 occurs according to such specifications, all of which are incorporated herein by reference.

In some embodiments described herein, the "REE" can refer to a second execution environment or an unsecure execution environment, and these terms may be used interchangeably. Similarly, "TEE" can refer to a first execution environment or a secure execution environment, and these terms may also be used interchangeably. In other embodiments, the second execution environment may also be a secure execution environment in that it has access to data and/or resources which are not accessible to another execution environment.

Data in the second execution environment can be encrypted using the first secure execution environment and the second execution environment and a chain of encryption keys.

Conventional computing devices include an immutable, unique root key that is stored in secure memory and can only be accessed by the TEE. The immutable key is encoded in hardware, or is permanently stored in secure storage of the TEE at manufacture. An encryption key used to secure data in the REE can be sent to the TEE to be encrypted by the immutable root key. The encrypted encryption key is then stored in the REE.

When access to data is to be revoked, the REE deletes the encrypted encryption key. Without the encrypted encryption key, any data encrypted by the unencrypted encryption key, or a second encryption key encrypted by the unencrypted encryption key, cannot be recovered.

However, if the REE is compromised, the deletion of the encrypted encryption key may be intercepted and stopped or rolled-back. For example, a malicious user may backup the encrypted encryption key and restore the encrypted encryption key after it has been deleted to regain access to the data.

One possible way to implement a rollback resistant key may be implemented by recording hash values of all encrypted encryption keys which have been encrypted with the immutable root key in TEE and storing the hash values in secure storage. When deleting the encryption keys, the TEE may also delete their hash values from secure storage such that if any deleted encryption key is rolled-back, the TEE can refuse to use the immutable root key to serve the malicious client because of the absence of the key's corresponding hash. However, if the TEE is compromised, then the TEE can cooperate and serve the malicious client.

The ability of a compromised REE to backup and restore (e.g. rollback) encrypted encryption keys (or hash value of encryption keys) and a compromised TEE to utilize the immutable root key to decrypt the restored encrypted encryption keys enable malicious software to gain unauthorized access to sensitive data encrypted using an encryption key chain that includes the encrypted encryption key.

In some instances, aspects of the present disclosure as illustrated, for example, by the embodiments herein, may reduce or eliminate the ability of malicious software or users of computing devices to backup and restore (e.g. rollback) encryption keys of an encryption key chain, which makes it cryptographically impossible to decrypt the sensitive data encrypted with the encryption keys of the encryption key chain, thereby increasing the security of the encrypted data.

Figure 2:
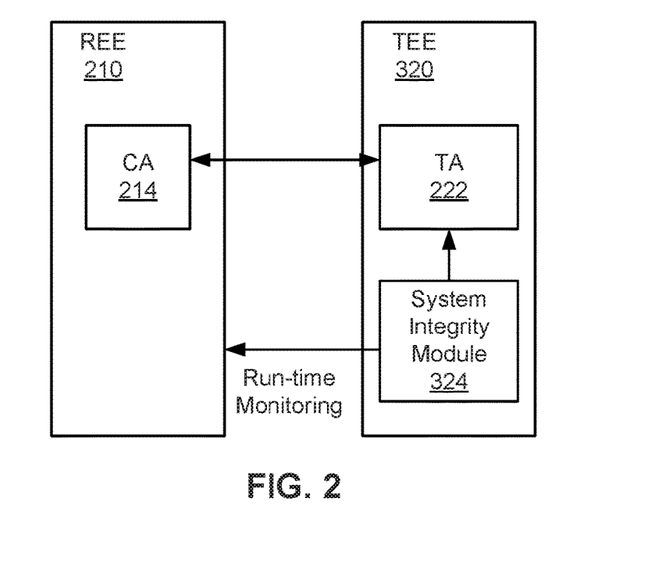
FIG. 2 illustrates, in a block diagram of a system or device with two execution environments, in accordance with embodiments.
Figure 3:
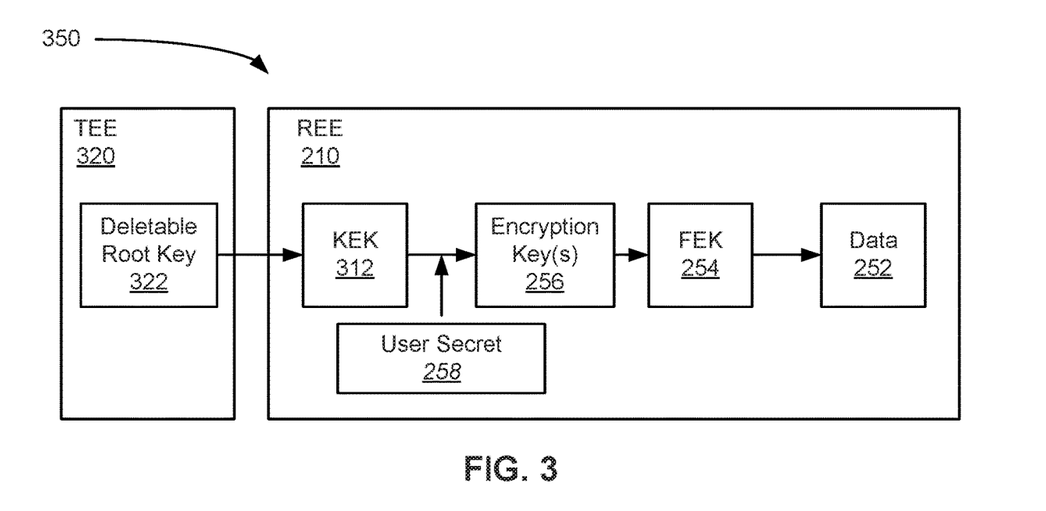
FIG. 3 illustrates, in a block diagram, a representation of aspects of an example of an encryption chain in accordance with embodiments.

With reference to FIGS. 2 and 3, in some embodiments, a secure execution environment includes or otherwise has access to a memory storing a deletable root key (e.g. a root key that can be removed, erased or deleted from the memory). This memory can be secure or otherwise inaccessible to applications executing in a second execution environment or otherwise outside the secure execution environment.

In some embodiments, the secure execution environment isolates the execution of tasks in the secure execution environment from the second execution environment. In some embodiments, tasks in the secure execution environment are executed by applications which can operate at the operating system level, firmware level, or any other suitable level of abstraction within the secure execution environment.

In some embodiments the software modules application is configured to delete the deletable root key upon detection of a trigger condition.

In some embodiments, the software modules are configured to detect a trigger condition indicative of detection of suspicious activity or integrity breach at the second operating system or elsewhere in the system.

As described herein or otherwise, in some embodiments, the term module can refer to software modules or sets of code/instructions executable by hardware components such as a processor. In some embodiments, the term module can include hardware modules such as hardware components or circuits. In some embodiments, module can include a combination of software and/or hardware components configured to perform one or more aspects of the processes described herein.

FIG. 2 is a block diagram showing aspects of two distinct execution environments (e.g. a secure execution environment and a second execution environment). The secure execution environment (e.g. TEE 320) includes applications which can perform secure functionality to be executed within the TEE 320 such as an application for performing root key operations on encryption key(s) utilized by an operating system of the TEE 320. In some platforms, an application in the TEE 320 is referred to as a trusted application (TA) 222. In some embodiments, a trusted application can perform a function such as acting as a cryptographic keystore, or can provide security functionality which may be offloaded from or otherwise associated with application(s) running in the second execution environment.

In some embodiments, the second execution environment (e.g., REE) 210 can operate one or more applications which can include user applications such as e-mail clients or web browsers. In the embodiment depicted in FIG. 2, the REE 210 includes one application, which is referred to as a client application (CA) 214, that can invoke or otherwise interact with the TA 222, to offload sensitive operations. In some embodiments, a CA 214 and a TA 222 can communicate or otherwise pass data via controlled inter-environment interfaces and/or APIs. Although one CA 214 is depicted in FIG. 2, a person of ordinary skill in the art will recognize that in alternative embodiments, the REE 210 may include multiple client applications and that each client application CA 214 can invoke or otherwise interact with multiple TAs to offload sensitive operations.

In some embodiments, the client application 214 can include a key management system, such as KMS 330 (FIG. 4A), in the REE 210 which invokes, calls functions, or otherwise interacts with a corresponding trusted application key management system, such as KMS TA 340 (FIG. 4A), in the TEE 320.

In some embodiments, the applications operating in the TEE can include a system monitoring module 324 which is configured to monitor runtime activity on the REE 210. For example, in some embodiments, the system monitoring module monitors, either periodically or triggered on access, the integrity of systems or processes such as key management systems or any number of hardware and/or software components which provides access to the TEE 320 (for example, an entrance module, or a built-in anti-root/anti-malware module). If an attacker alters such a system (either its code or data) to bypass certain permission checks, or to shut it down forcibly, the system monitoring module 324 detects such an event (e.g., by verifying the digest or signature of the monitored section of code and data) and triggers an appropriate action to secure sensitive data. When suspicious activity (e.g., an anomaly) or a compromise (such as an integrity system breach) is detected at the REE 210, the system monitoring module 324 may delete or trigger the deletion of a deletable root key. An example of an integrity system breach is a detection of a modification on data or code in an entrance module or other interface or communication mechanism between the REE 210 to the TEE 320 that is monitored. As illustrated below or otherwise, without the deleted root key, the TEE 320 is not able to verify or decrypt an encrypted key (e.g. KEK 312) for the REE 210. Thus, even a rolled-back (e.g. backed up and restored) encrypted KEK 312 cannot be used to access the data 252 even if the TEE 320 is subsequently compromised. In some embodiments, the function to delete the deletable root key 322 is executed within the TEE 320 so that the deletion cannot be stopped by malware or an attack on the REE 210.

FIG. 3 is a block diagram illustrating a logical representation of aspects of an example encryption key chain 350 used for encryption and decryption of data on computing device 100, in accordance with embodiments of the present disclosure. Portions of the encryption key chain 350 are secured within the TEE 320 while other portions are stored or otherwise accessible to the REE 210.

Encryption key chain 350 includes a file encryption key (FEK) 254 used to encrypt/decrypt data 252. The FEK 254 is encrypted by one or more encryption key(s) (e.g., DEK or CEK) 256. Encryption key(s) 256 used in the REE 210 may be encrypted by a KEK 312 generated in the REE 210. A user secret (e.g. a user password and/or user credentials) 258 may provide access to the encryption key 256. The user secret 258 may include a user password, personal identification number (PIN), pattern or biometrics. The user secret 258 may be used to protect and authorize the usage of the KEK 312 (rather than accessing the DEK 256 directly). For added security, the KEK 312 is using a deletable, hidden root key 322 in the TEE 320 as described in further detail below. In some embodiments, the KEK 312 may be encrypted and stored on the REE 210 side with its encryption cryptographically bound to the user secret 258 (and thus, the deletable root key 322). When the user provides the correct secret, TEE 320 is able to decrypt and retrieve the correct KEK 212 in plaintext in order to encrypt or decrypt the DEK 256 afterwards.

The deletable root key 322 is only accessible in the TEE 320, never leaves the TEE 320 and can only be permanently removed from the TEE 320 by a trusted application, such as TA 222. The deletable root key 322 is randomly generated in the TEE 320 or derived from other TEE-protected keys in the TEE 320. The deletable root key 322 can be generated in software, and stored in a memory (e.g., a secure storage area such as a replay protected memory block (RPMB)).

The KEK 312 is chained to the deletable, hidden, root key 322 accessible only in the TEE 320, making the KEK 312 rollback resistant. Recovery of the KEK 312 after deletion of the root key 322 is cryptographically impossible. Deletion of the deletable root key 322 inside the TEE 320, provides for the invalidation of the KEK 312 even if the REE 210 side system is compromised.

Embodiments described herein or otherwise can apply to the root key management in FDE or FBE. Both FDE and FBE use a root key in their encryption key chains (e.g., FIG. 3). Therefore, removing the root key in FDE or FBE can disable (malicious) user's access to secure data 252 (e.g. data encrypted using the encryption key chain 350). If FDE is used, work/personal (or sensitive/non-sensitive) data separation is performed at the partition level instead of at the file level.

While the example embodiments illustrated in the figures show two execution environments, aspects of the present disclosure can be applied to any number of execution environments. In some embodiments, a first operating system and a second execution environment may operate on different physical devices. For example, the TEE 320 may operate on a dedicated chip apart from the main central processing unit (CPU) upon which the REE 210 is operating. In another example, a REE 210 may operate on an IoT device and a corresponding TEE 320 may operate on a communication device in communication with the IoT device, or vice versa.

The example embodiments described herein show a single deletable root key; however, in other embodiments, multiple deletable root keys can be utilized for different key chains for one or more REEs.

Figure 4A:
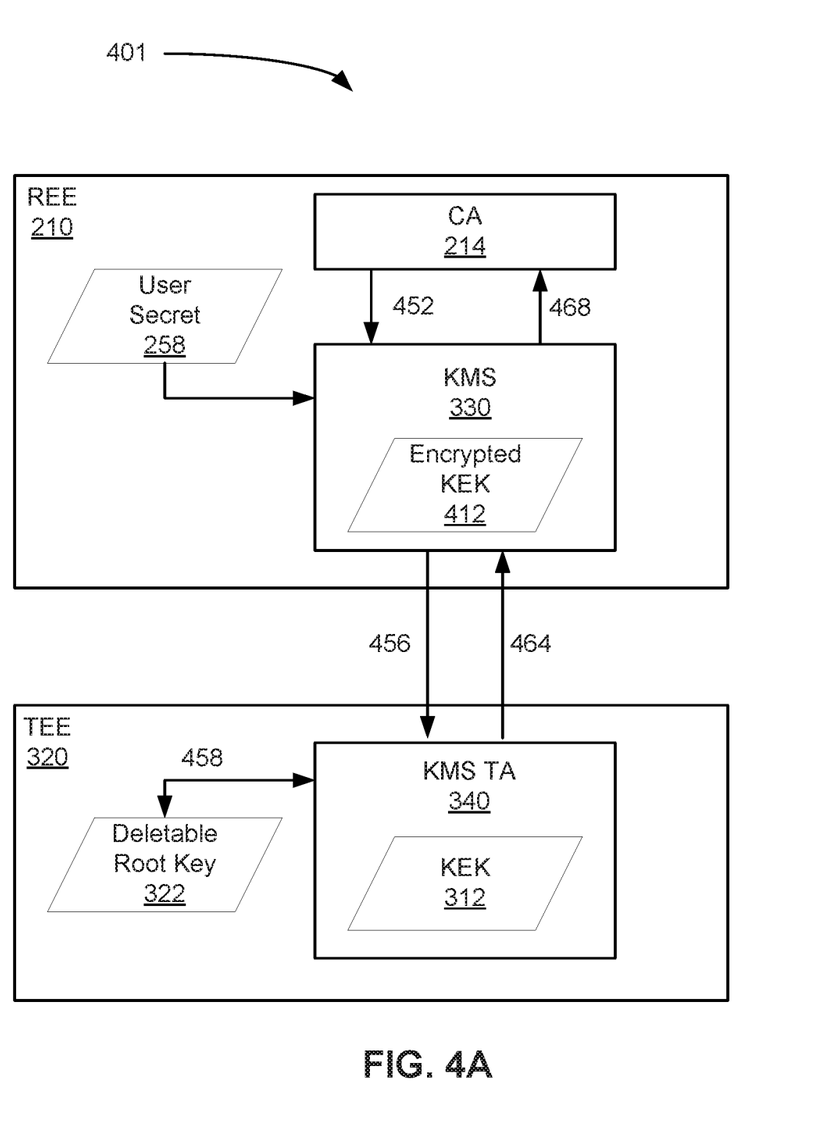
FIG. 4A shows a system block diagram illustrating interactions between a TEE and REE when an application is requesting creation of a key encryption key (KEK), in accordance with some embodiments.

FIG. 4A is a system 401 block diagram illustrating interactions between aspects of a TEE 320 and a REE 210. In this example embodiment, a CA 214 is requesting creation of a KEK (e.g. KEK 312). In the example in FIG. 4A, key management tasks are handled by a key management system (KMS) 330 in the REE 210 which interacts with a key management system trusted application (KMS TA) 340 in the TEE 320. In some operating systems, e.g. Android™ OS, the KMS is referred to as the keystore.

While example embodiments described herein refer to KMS 330 and KMS TA 340, in other embodiments, the functions provided by the KMS 330 and KMS TA 340 can be similarly provided by other suitable client and trusted applications.

Figure 4B:
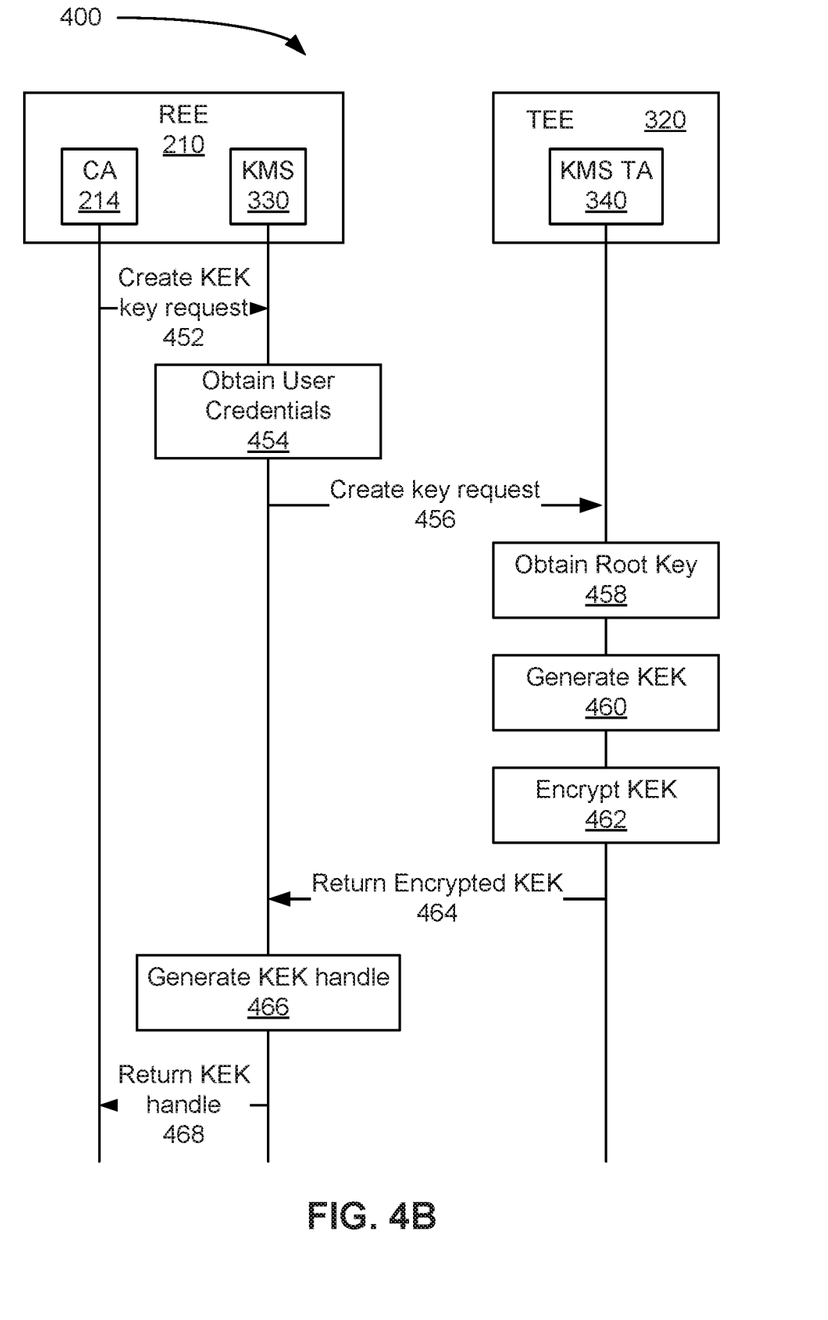
FIG. 4B is a flow diagram showing aspects of an example method for generating an encrypted KEK, in accordance with some embodiments.

The interaction between KMS 330 and KMS TA 340 are described further with reference to FIG. 4B which shows a flow diagram showing aspects of an example method 400 for generating KEK 312 and an encrypted KEK 412 from KEK 312.

The encrypted KEK 412 may be generated, for example, in a number of situations, such as at the onset of the creation of a new encrypted data file, upon receiving a request to create a new user account, etc. The KMS 330 may receive a request to create KEK 312 from CA 214 executing in the REE 210. The KMS 330 receives a create KEK key request message 452 and obtains 454 user secret 258 to be associated with the KEK 312. In some embodiments the user secret 258 can be received from the CA 214, retrieved from memory 104, received via a user input device, or obtained through any other mechanism.

The KMS 330 sends a create key request message 456 that instructs or prompt the KMS TA 340 of the TEE 320 to generate the KEK 312. The create key request message 456 may optionally include the user secret 258 or a value associated with the user secret 258 (such as a hash, or a key or other value unlocked by the user password or user credentials). The KMS TA 340 obtains 458 (i.e., generate or retrieve if previously generated) a deletable root key 322. The deletable root key 322 is a random number which is generated in the TEE 320. The KMS TA 340 may then generate the KEK 312, which is a random number associated with the user secret 258. In some embodiments, the KEK 312 is cryptographically bound to the user secret 258. The KMS TA 340 then encrypts 462 the KEK 312 using the deletable root key 322 and generate the encrypted KEK 412. In some embodiments, the step of obtaining 458 the deletable root key 322 is performed after the step of generating 462 the KEK 312. After the KMS TA 340 encrypts 462 the KEK 312, the KMS TA 340 sends a return key response message 464 that includes a keyblob with the encrypted KEK 412 to the KMS 330. Upon receipt of the return key response message 464, the KMS 330 may then generate 466 a KEK handle and send a return KEK handle message 468 that includes the KEK handle to the CA 214

For security reasons, the unencrypted KEK 312 is not sent to KMS 330 and stored in unsecure memory of the REE 210. Instead, a keyblob that includes the encrypted KEK 412 is sent to the KMS 330 in the return encrypted KEK message 464. The keyblob is a representation of the encrypted KEK 412 (i.e., an encryption or wrapping around the unencrypted KEK 312) may also include other information related to the KEK 312, such as version, key characteristics (e.g., size, intended usage, etc.), authorization methods, digest or signature (for integrity checks), etc. The Keyblob may be managed by the KMS 330 internally without exposing the keyblob directly to CA 214 which requested the KEK 312. In order the use keyblob, CA 214 may use the handle that is generated by the KMS 330 as a unique reference to the keyblob. Only the KMS 330 knows the mapping between the unique handle and the actual keyblob.

Figure 5A:
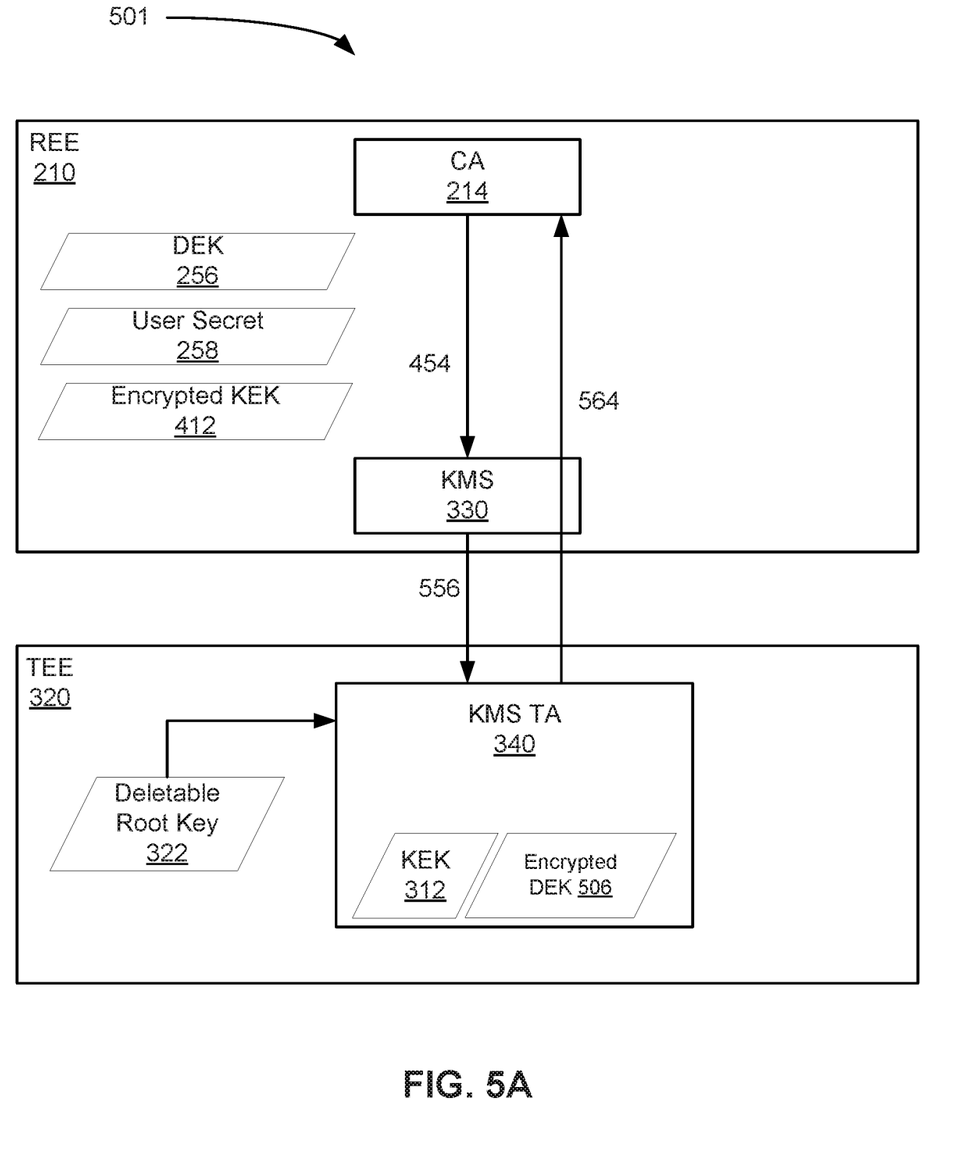
FIG. 5A shows a system block diagram illustrating interactions between a TEE and REE for securing a data encryption key (DEK) in an encryption chain, in accordance with some embodiments.

FIG. 5A is a system 501 block diagram illustrating interactions between aspects of a TEE 320 and a REE 210. In this example embodiment, CA 214 generates a DEK 256 to be secured in encryption key chain 350. The interaction between these applications are described further with reference to FIG. 5B which shows a flow diagram showing aspects of an example method 500 for generating an encrypted DEK 312. It should be understood that the method 500 may also be applied to any key (e.g., key-X) that is to be encrypted using the KEK 312 generated by KMS TA 340.

Figure 5B:
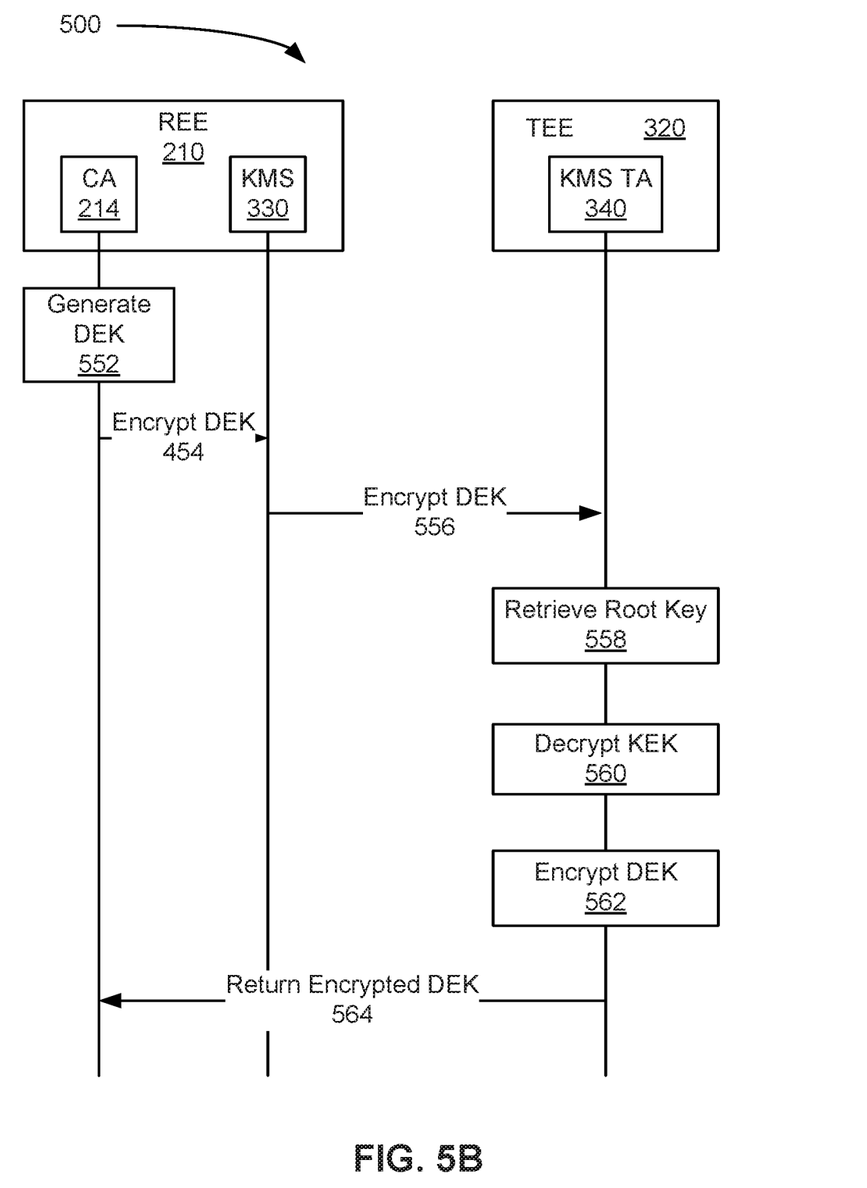
FIG. 5B shows a flow diagram showing aspects of an example method for generating an encrypted DEK, in accordance with some embodiments.

The method 500 starts with CA 214 in the REE 310 generating 552 a DEK 256 (e.g., a DE/CE in the Android™ OS). CA 214 may then send an encrypt DEK request message 554 to the KMS 330. The encrypt DEK request message 554 may include the generated DEK 256, user secret 258 associated with the DEK 256, and the keyblob 412 that includes the encrypted KEK. The KMS 330 may then send an encrypt DEK request message 556 to the KMS TA 340 in the TEE 320 to encrypt the DEK 256 with the KEK 312. The encrypt DEK request message 556 includes the DEK 256, the encrypted KEK 412, and the user secret 258. The KMS TA 340 may then verify the user secret 258 used to generate the KEK 312. For example, a check on the digest will be able to identify whether or not the user secret 258 is correct (i.e., incorrect user credentials 258 will not be able to decrypt other items related to the KEK 312, such as the digest). The KMS TA 340 may then retrieve 558 the deletable root key 322 and use the deletable root key 322, together with the user secret 258, to decrypt 560 the encrypted KEK 412 to obtain the KEK 312 (and any enclosed information included in the keyblob 412). The KMS TA 340 then encrypts the DEK 256 with the KEK 312 and sends the encrypted DEK 506 to the CA 214 executing in the REE 210 via an encrypt DEK response message 564.

It should be noted that in this disclosure, any sending of user secret 258 is not limited to only sending the user secret 258 per se. In some embodiments, the user secret 258 may be transformed, hashed or mixed in with other information (such as a salt or user identification) before being passed to the TEE 320 from the REE 210 via a controlled inter-environment interface, APIs and/or otherwise. In some embodiments, the user secret 258 can be a user password or user credentials that can be used to unlock a key or other secret value associated with the KEK in the TEE 320. As long as the TEE 320 receives the exact same secret (bit-to-bit) as the one used for creating the KEK 312, the TEE 320 can then decrypt the encrypted KEK 412 correctly.

Figure 6A:
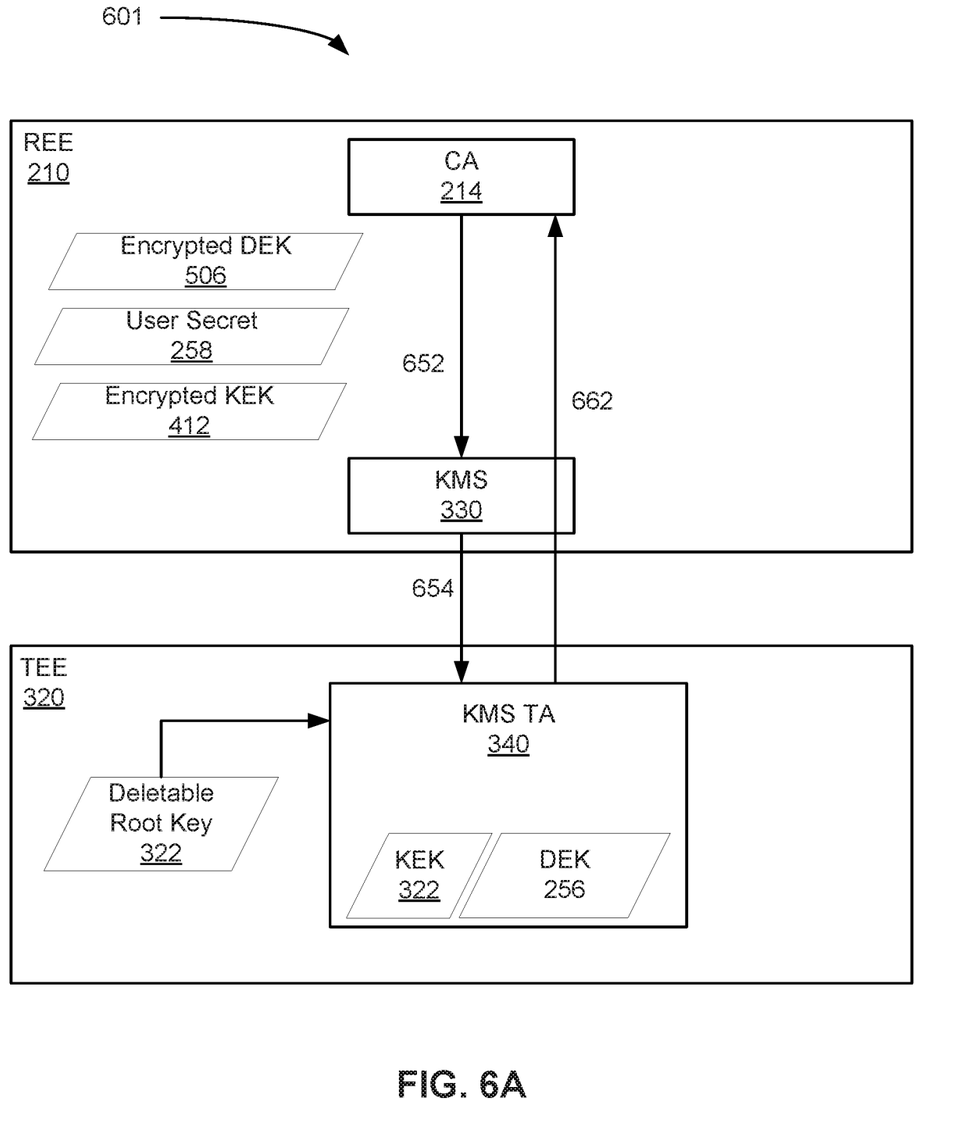
FIG. 6A shows a system block diagram illustrating interactions between a TEE and REE for decrypting a key encrypted by an encryption chain, in accordance with some embodiments.

FIG. 6A is a system 601 block diagram illustrating interactions between aspects of a TEE 320 and a REE 210. In this example embodiment, CA 214 requests access to a DEK which has been encrypted by encryption key chain 350 depicted in FIG. 3B. The interaction between these applications are described further with reference to FIG. 6B which shows a flow diagram showing aspects of an example method 600 for decrypting an encrypted DEK 506.

Figure 6B:
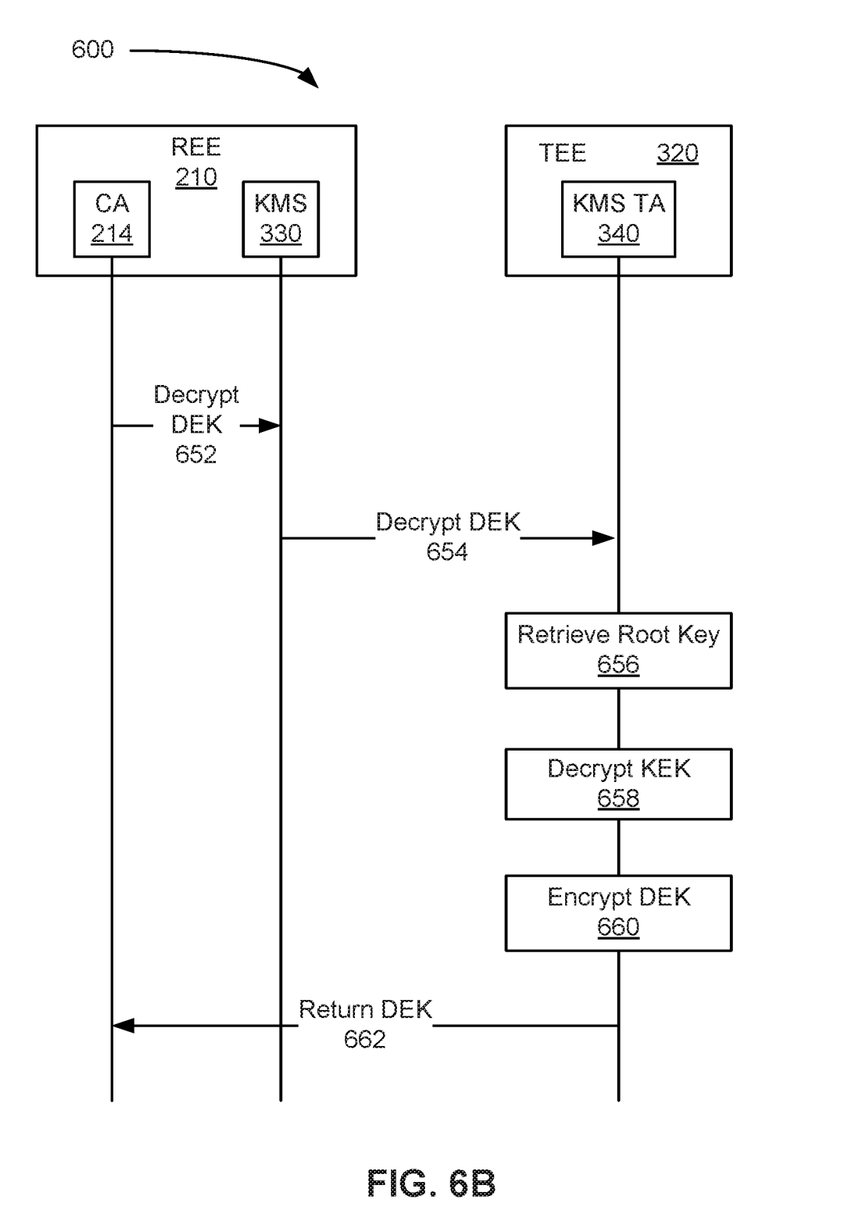
FIG. 6B is a flow diagram showing aspects of an example method for decrypting an encrypted DEK, in accordance with some embodiments.

CA 214 has access to an encrypted DEK 506, but uses the DEK 256 to access data stored in storage 106 that is encrypted using the encryption key chain 350. The method 600 begins with CA 214 sending a decrypt DEK request message 652 to the KMS 330 of the REE 310. The decrypt DEK request message 652 may include the encrypted DEK 506, user secret 258 associated with the encrypted DEK 506 and the encrypted KEK 312. Next the KMS 330 sends a decrypt DEK request message 654 to the TMS TA 340 in the TEE 320 to decrypt the encrypted DEK 506 with the KEK 312. The decrypt DEK request message 654 includes the encrypted DEK 506 to be decrypted, and the encrypted KEK 312. In some embodiments, the decrypt DEK request message 654 further includes user secret 258. Similar to the process described above or otherwise, the KMS TA 340 may verify the user secret 258 and retrieves 656 the deletable root key 322 from secure storage 114. The KMS TA 340 then decrypts 658 the encrypted KEK 312 using the deletable root key 322 to obtain the KEK 312. The KMS TA 340 then decrypts 660 the encrypted DEK 506 with the KEK 312 to obtain the DEK 256. The KMS TA 340 may then send the DEK 256 to the KMS 330 of the REE 210 via a decrypt DEK return message 662.

Figure 7A:
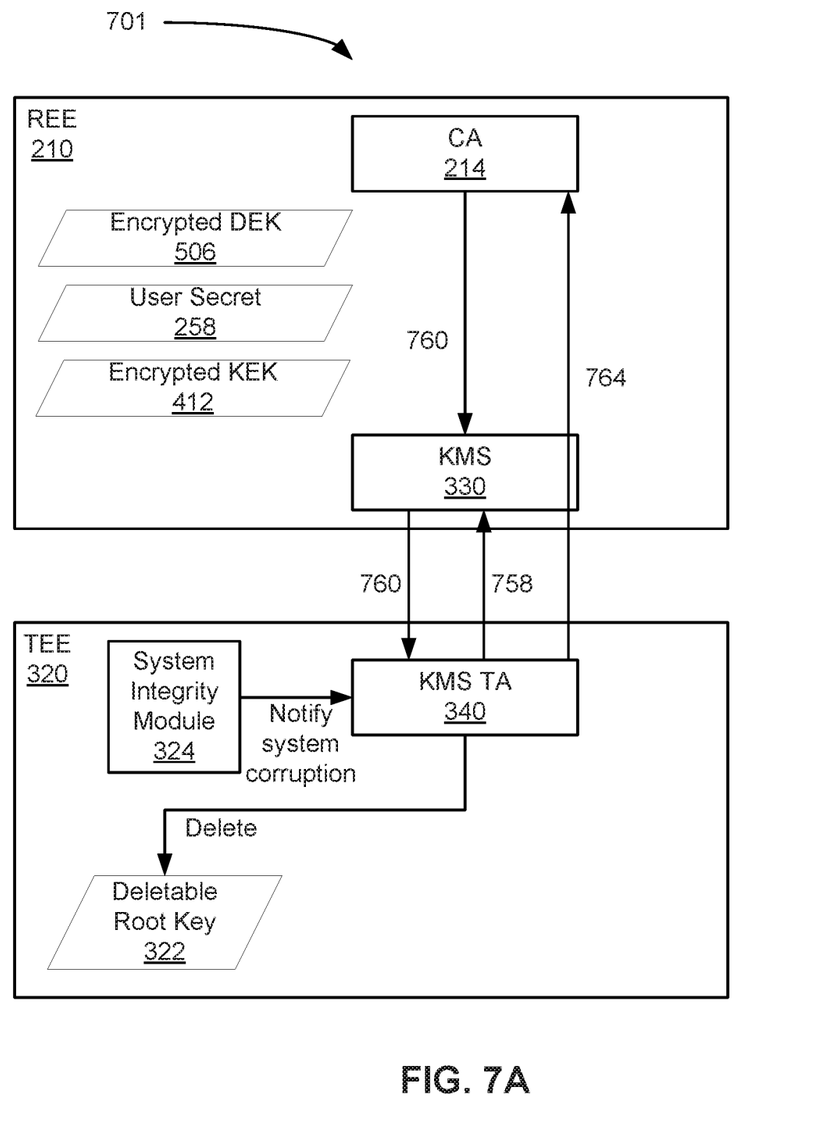
FIG. 7A shows a system block diagram illustrating interactions between a TEE and REE when an integrity breach is detected, in accordance with some embodiments.

FIG. 7A is a system 701 block diagram illustrating interactions between aspects of a TEE 320 and a REE 210. In this example embodiment, a system integrity module 324 detects a potential integrity breach at the REE 210. The interaction between these applications are described further with reference to FIG. 7B which shows a flow diagram showing aspects of an example method 700 for securing data encrypted with encryption key chain 350 depicted in FIG. 3B.

Figure 7B:
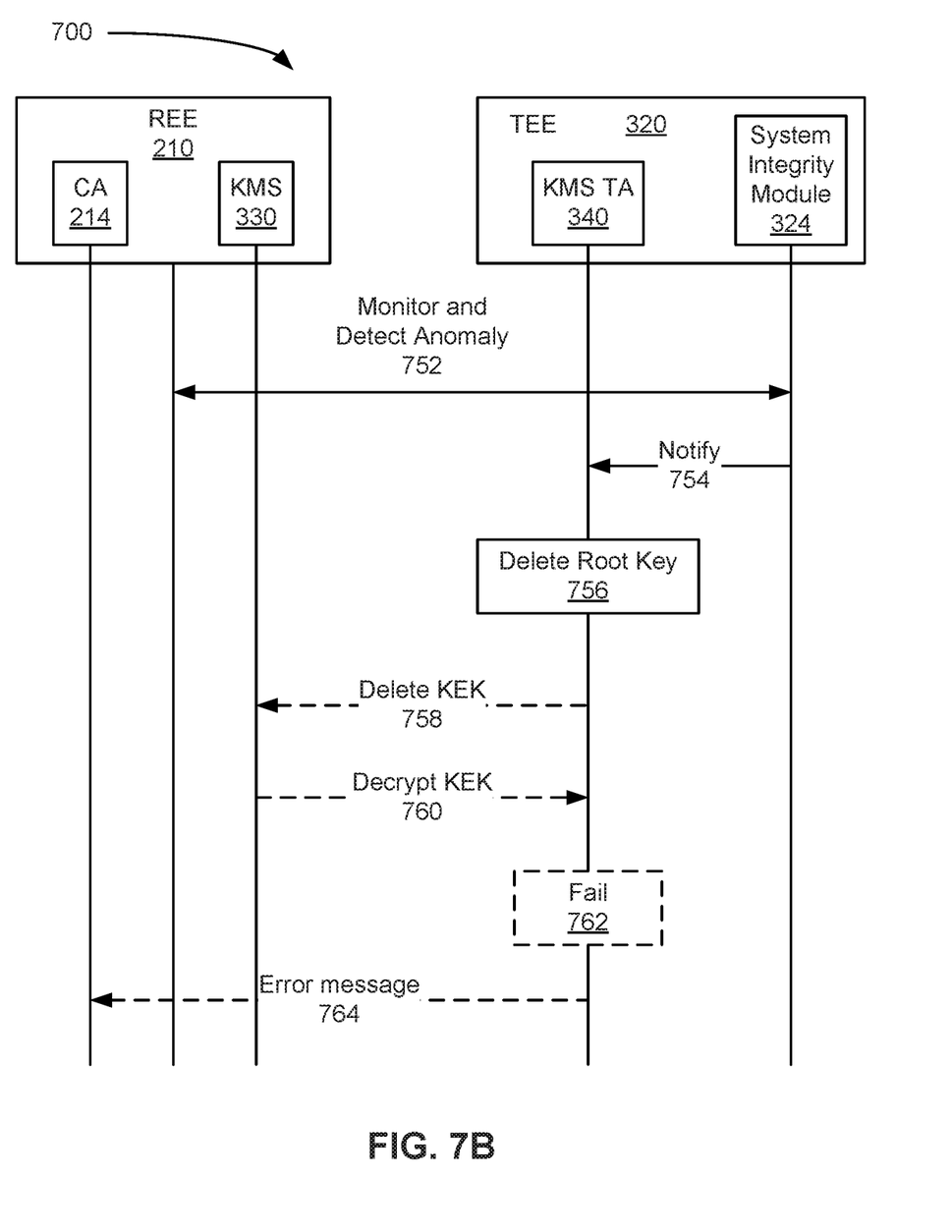
FIG. 7B shows a flow diagram showing aspects of an example method for securing data encrypted with an encryption chain, in accordance with some embodiments.

At 752, the system integrity module 324 monitoring and detects a potential integrity breach at the REE 210. The KMS TA 340 then receives a signal or message 754 from the system integrity module 324 to delete the deletable root key 322. After receipt of the signal or message 754, the KMS TA 340 deletes 756 the deletable root key 322. Thus, the encrypted KEK 412 can no longer be decrypted. Without the KEK 312, the encrypted DEKs 506 can no longer be decrypted to access data encrypted using the encryption key chain depicted in FIG. 3B. The KMS TA 340 may optionally send a delete KEK message 758 to the KMS 330 in the REE 210 to instruct the KMS 330 to delete or otherwise invalidate the encrypted KEK 412 on the REE 210.

In the event the REE 310 becomes compromised and a malicious attacker attempts to send a decrypt DEK request message 654 using a rolled-back version (e.g. backed up and restored version) of a deleted encrypted KEK 412 after the deletable root key 322 has been deleted (or if the REE is unaware that the root key has been deleted), the KMS TA 340 will fail 762 to decrypt the encrypted KEK 412 because it is not cryptographically possible to decrypt the KEK without the deletable root key 322 (which has been deleted). As a result, the KMS TA 340 will not be able to decrypt the encrypted DEK 506. An error message 764 will be sent to the CA 214.

In some instances, aspects of embodiments described herein can increase the security of encrypted information stored on computing device. In some instances, utilizing a deletable root key which never leaves a secure execution environment allows for authorized access by a trusted user (e.g. with the correct credentials) but reduces the ability of malware or attackers to gain access to encryption keys needed to decrypt encrypted sensitive data. Upon detection of suspicious activity, deletion of the deletable root key by processes in the secure execution environment can permanently prevent attackers from accessing or otherwise backing up and restoring (e.g. rolling back) the encryption keys required to decrypt encrypted sensitive data even if the secure execution environment is subsequently breached.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computing device comprising:
a trusted execution environment with access to a secure memory storing a deletable root key, the secure memory inaccessible by a second execution environment; and
at least one processor operable in the trusted execution environment, wherein when operating in the trusted execution environment, the at least one processor is configured for:
based on a request from the second execution environment, using the deletable root key in the secure memory to perform a root key operation on an encryption key utilized by the second execution environment to secure data accessible by the second execution environment; and
deleting the deletable root key in the secure memory upon detection of a security event.

2. The computing device of claim 1, wherein:
when operating in the trusted execution environment, the at least one processor is configured to detect the security event,
wherein the detection the security event includes detecting a system integrity breach or receiving a message from the second execution environment indicative of a suspicious activity.

3. The computing device of claim 1, wherein when operating in the trusted execution environment, the at least one processor is configured to generate the deletable root key.

4. The computing device of claim 2, when operating in the trusted execution environment, the at least one processor is configured to:
receive a decryption request to decrypt an encrypted data key from the second execution environment; and
when the deletable root key has been deleted, send an error message to the second execution environment.

5. The computing device of claim 1, wherein when operating in the trusted execution environment, the at least one processor is configured to execute a key management service trusted authority (KMS TA) for performing the root key operation based on the request received from a key management service (KMS) operating in the second execution environment.

6. The computing device of claim 1, when operating in the trusted execution environment, the at least one processor is configured to:
generate a key encryption key (KEK) or receive the KEK from the second execution environment;
encrypt the KEK using the deletable root key; and
send the encrypted KEK to the second execution environment.

7. The computing device of claim 1, wherein when operating in the trusted execution environment, the at least one processor is configured to:
receive a data key and an encrypted key encryption key (KEK) from the second execution environment;
decrypt the encrypted KEK using the deletable root key;
encrypt the data key using the decrypted KEK; and
send the encrypted data key to the second execution environment.

8. The computing device of claim 1, wherein when operating in the trusted execution environment, the at least one processor is configured to:
receive an encrypted data key and an encrypted key encryption key (KEK) from the second execution environment;
decrypt the encrypted KEK using the deletable root key to obtain a KEK;
decrypt the encrypted data key using the KEK to obtain a data key; and
send the data key to the second execution environment.

9. The computing device of claim 1, wherein the second execution environment is a rich execution environment (REE).

10. A computer implemented method for securing data comprising:
storing a deletable root key in a secure memory accessible by a trusted execution environment of a computing device, the secure memory inaccessible by a second execution environment;
based on a request from the second execution environment, using the deletable root key in the secure memory to perform, by at least one processor of the computing device operating in the trusted execution environment, root key operations on an encryption key utilized by the second execution environment to secure data accessible by the second execution environment; and
upon detection of a security event, deleting the deletable root key in the secure memory.

11. The computer implemented method as claimed in claim 10, comprising:
detecting the security event, by the at least one processor of the computing device operating in the trusted execution environment, wherein detecting the security event includes detecting a system integrity breach or receiving a message from the second execution environment indicative of a suspicious activity.

12. The computer implemented method of claim 10, comprising:
generating the deletable root key for storage in the secure memory accessible by the trusted execution environment.

13. The computer implemented method as claimed in claim 10, comprising:
receiving, by the at least one processor of the computing device operating in the trusted execution environment, a decryption request to decrypt an encrypted data key from the second execution environment; and
when the deletable root key has been deleted, sending an error message to the second execution environment.

14. The computer implemented method of claim 10, wherein the at least one processor of the computing device operating in the trusted execution environment is configured to provide a key management service trusted authority (KMS TA) for performing the root key operations based on the request received from a key management service (KMS) operating in the second execution environment.

15. The computer implemented method as claimed in claim 10, comprising:
generating, by the at least one processor of the computing device operating in the trusted execution environment, a key encryption key (KEK) or receiving the KEK from the second execution environment;
encrypting, by the at least one processor of the computing device operating in the trusted execution environment, the KEK using the deletable root key; and
sending the encrypted KEK to the second execution environment.

16. The computer implemented method as claimed in claim 10, comprising:
receiving, by the at least one processor of the computing device operating in the trusted execution environment, a data key and an encrypted key encryption key (KEK) from the second execution environment;

decrypting, by the at least one processor of the computing device operating in the trusted execution environment, the encrypted KEK using the deletable root key;

encrypting, by the at least one processor of the computing device operating in the trusted execution environment, the data key using the KEK; and sending the encrypted data key to the second execution environment.

17. The computer implemented method as claimed in claim 10, further comprising:

receiving, by the at least one processor of the computing device operating in the trusted execution environment, an encrypted data key and an encrypted key encryption key (KEK) from the second execution environment;

decrypting, by the at least one processor of the computing device operating in the trusted execution environment, the encrypted KEK using the deletable root key to obtain a KEK;

decrypting, by the at least one processor of the computing device operating in the trusted execution environment, the encrypted data key using the KEK to obtain a data key; and sending the data key to the second execution environment.

18. The computer implemented method as claimed in claim 10, wherein the second execution environment is a rich execution environment (REE).

19. A non-transitory computer-readable storage medium having stored thereon computer-executable instructions which when executed configure at least one processor operating in a trusted execution environment of a computing device to:

store a deletable root key in a secure memory accessible by the trusted execution environment, the secure memory inaccessible by a second execution environment;

based on a request from the second execution environment, use the deletable root key in the secure memory to perform, root key operations on an encryption key utilized by the second execution environment to secure data accessible by the second execution environment; and upon detection of a security event, delete the deletable root key in the secure memory.

20. The non-transitory computer-readable storage medium as claimed in claim 19, wherein the detection of the security event includes detecting a system integrity breach or receiving a message from the second execution environment indicative of a suspicious activity.

* * * * *